Patented Aug. 25, 1925.

1,550,968

UNITED STATES PATENT OFFICE.

LOUIS E. KLUG, OF INDIANAPOLIS, INDIANA, ASSIGNOR TO RUB-TEX PRODUCTS, INC., OF INDIANAPOLIS, INDIANA, A CORPORATION OF INDIANA.

RUBBER COMPOSITION AND PROCESS OF MAKING IT.

No Drawing. Application filed January 21, 1921. Serial No. 439,018.

*To all whom it may concern:*

Be it known that I, LOUIS E. KLUG, a citizen of the United States, residing at Indianapolis, in the county of Marion and State of Indiana, have invented new and useful Rubber Compositions and Processes of Making Them, of which the following is a specification.

It is the object of my invention to produce a rubber composition, suitable for rubber mats, jars, and many other things, which has the life and resiliency ordinarily only obtainable by the intermixture of pure fresh rubber gum, but which may be made largely or wholly from the waste products of rubber manufactures, and which has added strength from the embedment in it of fibers of fabric. From another viewpoint, it is the object of my invention to utilize the waste from the production of the so-called "uncured friction," which is fabric impregnated with unvulcanized rubber gum and the waste of which is ordinarily merely a source for reclaiming rubber, to give a rubber composition both the life and resiliency of pure rubber gum and the strength of the fibers of the fabric.

In the manufacture of tires, the fabric used is impregnated with uncured rubber gum by being passed with such gum between suitable rollers, which press the gum into the fabric to produce thorough impregnation. This impregnated fabric is the "uncured friction" referred to above. In using this "uncured friction," there is considerable waste, because it is cut into strips which are necessarily somewhat too wide, and in building the tire the excess at the edges of these strips is cut off. This excess which is cut off has heretofore been waste, considered suitable only for treatment to reclaim the rubber, the fabric being destroyed in the reclaiming process. The reclaimed rubber does not have the life and resiliency of the original rubber, and the fabric is lost.

According to my process, I use this waste "uncured friction" to obtain the properties both of the uncured rubber gum and of the fibers of the fabric, to produce cheaply a rubber composition of relatively great strength and resiliency and having a long life, by mixing this waste "uncured friction" with other waste products and with suitable chemicals and pigments to produce the desired vulcanization and coloring. The proportions of these several ingredients may be varied to a considerable extent, according to the nature of the end product desired.

The main ones of the other waste products which I prefer to use are scrap rubber and reclaimed rubber, obtained from any available sources. The reclaimed rubber is de-vulcanized in the process of reclaiming, as is well known. The scrap rubber is not de-vulcanized. The scrap rubber serves mainly, however, as a filler. The scrap rubber is conveniently obtained from scrap rubber matting. To denote both these classes of scrap rubber and reclaimed rubber, as distinguished from new rubber, I use the term "old rubber-containing material."

As one example of such product, I mix approximately 50% of scrap rubber matting with approximately 15% of reclaimed rubber, add approximately 5 to 10% of sulphur, and 10 to 15% other chemicals, and pigments if color is desired, and to that add approximately 15% of the scrap "uncured friction," which last is previously ground or broken on suitable breaking rollers. These ingredients are mixed on a suitable mill, and then passed through the desired calender rolls which makes sheets of any desired thickness. The rubber of the "uncured friction" furnishes the desired new rubber gum, which has never previously been vulcanized. The fibers of the fabric which is in the "uncured friction" are embedded throughout the final composition and materially increase its tensile strength. The composition thus formed is then molded in any desired form, and suitably cured, and provides a material with high resiliency and long life as well as with considerable strength; and it can be made cheaply from materials which are almost wholly waste.

The percentage of the various ingredients may be varied as desired. The fundamental feature is not in the proportions of the several ingredients, but in the addition to the other ingredients of the scrap "uncured friction" in suitable proportions so that the rubber which is in the "uncured friction" will furnish the quantity of pure gum desired for the final product.

I claim as my invention:

1. The process of making a rubber composition, which consists in mixing scrap and reclaimed rubber with sulphur, and adding "uncured friction."

2. The process of making a rubber composition, which consists in mixing old rubber-containing material with "uncured friction" and sulphur, with the old rubber-containing material in sufficient amount to provide at least half of the whole, and vulcanizing the compound thus produced.

3. The process of making a rubber composition, which consists in mixing old rubber-containing material with "uncured friction" and sulphur, with the "uncured friction" forming less than one-third of the whole, and vulcanizing the compound thus produced.

4. The process of making a rubber composition, which consists in mixing old rubber-containing material with "uncured friction" and sulphur, with the old rubber-containing material forming at least half of the whole and the "uncured friction" forming less than one-third of the whole, and vulcanizing the compound thus produced.

5. The method of making a rubber composition, which consists in mixing reclaimed rubber and a filler with sulphur and "uncured friction," with the reclaimed rubber and filler constituting at least half of the whole and the "uncured friction" and sulphur together constituting less than half of the whole, and vulcanizing the compound thus produced.

6. A rubber composition, comprising a vulcanized mixture of approximately 50% of rubber matting scrap, approximately 15% of reclaimed rubber, approximately 5 to 10% of sulphur and 10 to 15% of other chemicals and pigments to produce vulcanization and coloring, and approximately 15% of "uncured friction."

7. A rubber composition, comprising a vulcanized mixture of old rubber-containing material and "uncured friction," with the old rubber-containing material constituting at least half of the whole.

8. A rubber composition, comprising a vulcanized mixture of reclaimed rubber and a filler with "uncured friction," with the reclaimed rubber and filler together constituting at least half of the whole.

In witness whereof, I have hereunto set my hand at Indianapolis, Indiana, this 18th day of January, A. D. one thousand nine hundred and twenty one.

LOUIS E. KLUG.